United States Patent
Kwan et al.

(10) Patent No.: US 9,042,222 B2
(45) Date of Patent: May 26, 2015

(54) DEADLOCK RECOVERY FOR DISTRIBUTED DEVICES

(71) Applicant: BROADCOM CORPORATION, Irvine, CA (US)

(72) Inventors: Bruce Kwan, Sunnyvale, CA (US); Puneet Agarwal, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 145 days.

(21) Appl. No.: 13/720,923

(22) Filed: Dec. 19, 2012

(65) Prior Publication Data

US 2014/0146666 A1 May 29, 2014

Related U.S. Application Data

(60) Provisional application No. 61/730,918, filed on Nov. 28, 2012.

(51) Int. Cl.
| | |
|---|---|
| *H04L 12/26* | (2006.01) |
| *H04L 12/801* | (2013.01) |
| *H04L 12/823* | (2013.01) |

(52) U.S. Cl.
CPC ............... *H04L 47/12* (2013.01); *H04L 47/32* (2013.01)

(58) Field of Classification Search
CPC ......... H04L 47/12; H04L 47/32; H04L 47/25; H04L 47/26; H04L 47/263; H04L 47/266; H04L 47/10–47/41
USPC ............... 370/230.1, 229–240; 709/223–226, 709/230–235
See application file for complete search history.

(56) References Cited

U.S. PATENT DOCUMENTS

| | | | | |
|---|---|---|---|---|
| 5,946,325 | A  * | 8/1999 | Shiota | 370/474 |
| 6,418,118 | B1 * | 7/2002 | Hay et al. | 370/230 |
| 7,009,968 | B2 * | 3/2006 | Ambe et al. | 370/389 |
| 7,756,977 | B2 | 7/2010 | Yong et al. | |
| 7,948,880 | B2 * | 5/2011 | Kwan et al. | 370/230 |
| 7,969,971 | B2 * | 6/2011 | Gai et al. | 370/389 |
| 8,170,019 | B2 | 5/2012 | Anand et al. | |
| 2011/0205892 | A1 * | 8/2011 | Wu | 370/230 |

OTHER PUBLICATIONS

"Software Flow Control", located at <http://en.wikipedia.org/w/index.php?oldid=509941627>, pp. 1-3.
(Continued)

*Primary Examiner* — Thai Hoang
*Assistant Examiner* — Kenneth P Hunt
(74) *Attorney, Agent, or Firm* — McDermott Will & Emery LLP

(57) ABSTRACT

A system for deadlock recovery of distributed devices may include a processor and memory. The processor may transmit packets to a device, receive a pause message indicating that the packet transmission should be paused, and initiate a timer and pause the packet transmission in response to receiving the pause message. The processor may enter a deadlock recovery state if the timer reaches a timeout before a resume message is received that indicates that the packet transmission can resume. The processor may, while in the deadlock recovery state, drop packets that have a packet age that is greater than a threshold, and may exit the deadlock recovery state upon dropping a packet that has a packet age less than the threshold, or upon receiving the resume message. The processor may re-initiate the timer if the resume message has not been received, otherwise the processor may resume the packet transmission.

20 Claims, 6 Drawing Sheets

(56) References Cited

OTHER PUBLICATIONS

"Ethernet Flow Control", located at <http://en.wikipedia.org/w/index.php?oldid=499466007>, pp. 1-4.

"Spanning Tree Protocol", located at <http://en.wikipedia.org/w/index.php?oldid=509088800>, pp. 1-11.

Cisco, "Quality of Service on the Cisco Catalyst 4500E Supervisor Engines", 2011, pp. 1-20.

\* cited by examiner

DEADLOCK RECOVERY FOR DISTRIBUTED DEVICES

CROSS-REFERENCE TO RELATED APPLICATIONS

The present application claims the benefit of U.S. Provisional Patent Application Ser. No. 61/730,918, entitled "Deadlock Recovery for Distributed Devices," filed on Nov. 28, 2012, which is hereby incorporated by reference in its entirety for all purposes.

TECHNICAL FIELD

The present description relates generally to deadlock recovery, and more particularly, but not exclusively, to deadlock recovery for distributed devices.

BACKGROUND

In a network environment implementing a priority flow control system, if a first network device that is receiving lossless traffic from a second network device becomes congested with the lossless traffic, (e.g. if the queues assigned to the lossless traffic reach their capacity, or reach a threshold level), the first network device may send a message to the second network device indicating that the second network device should pause the transmission of the lossless traffic, (e.g. a "pause" message). In response to receiving the pause message, the second network device may enter a transmit off (XOFF) state for the queues assigned to the lossless traffic. In the transmit off state, the lossless traffic may be buffered at the second network device, rather than transmitted to the first network device. Once the lossless traffic congestion is cleared at the first network device, the first network device may send a message to the second network device that indicates that the second network device may resume the transmission of the lossless traffic, (e.g. a "resume" message). The second network device may then re-enter the transmit on (XON) state for the queues assigned to the lossless traffic, in which the transmission of the lossless traffic resumes. The priority flow control system may function seamlessly in a network environment that only includes a single VLAN (virtual local area network), and consequently a single spanning tree, since the single spanning tree may ensure that loops are avoided in the network.

However, a cloud computing system that includes multiple VLANs, and therefore multiple spanning trees, may encounter a deadlock state if each of the VLANs includes lossless traffic. For example, since each of the individual VLANs may include lossless traffic, it may be possible for the collective lossless traffic of the VLANs to form a loop that may become deadlocked. In other words, although the multiple spanning trees may ensure that loops are avoided for the traffic of the individual VLANs, in some instances the lossless traffic across all of the VLANs, in aggregate, may form a loop that may result in a deadlock.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In one or more instances, well-known structures and components are shown in block diagram form in order to avoid obscuring the concepts of the subject technology.

Figure 1:
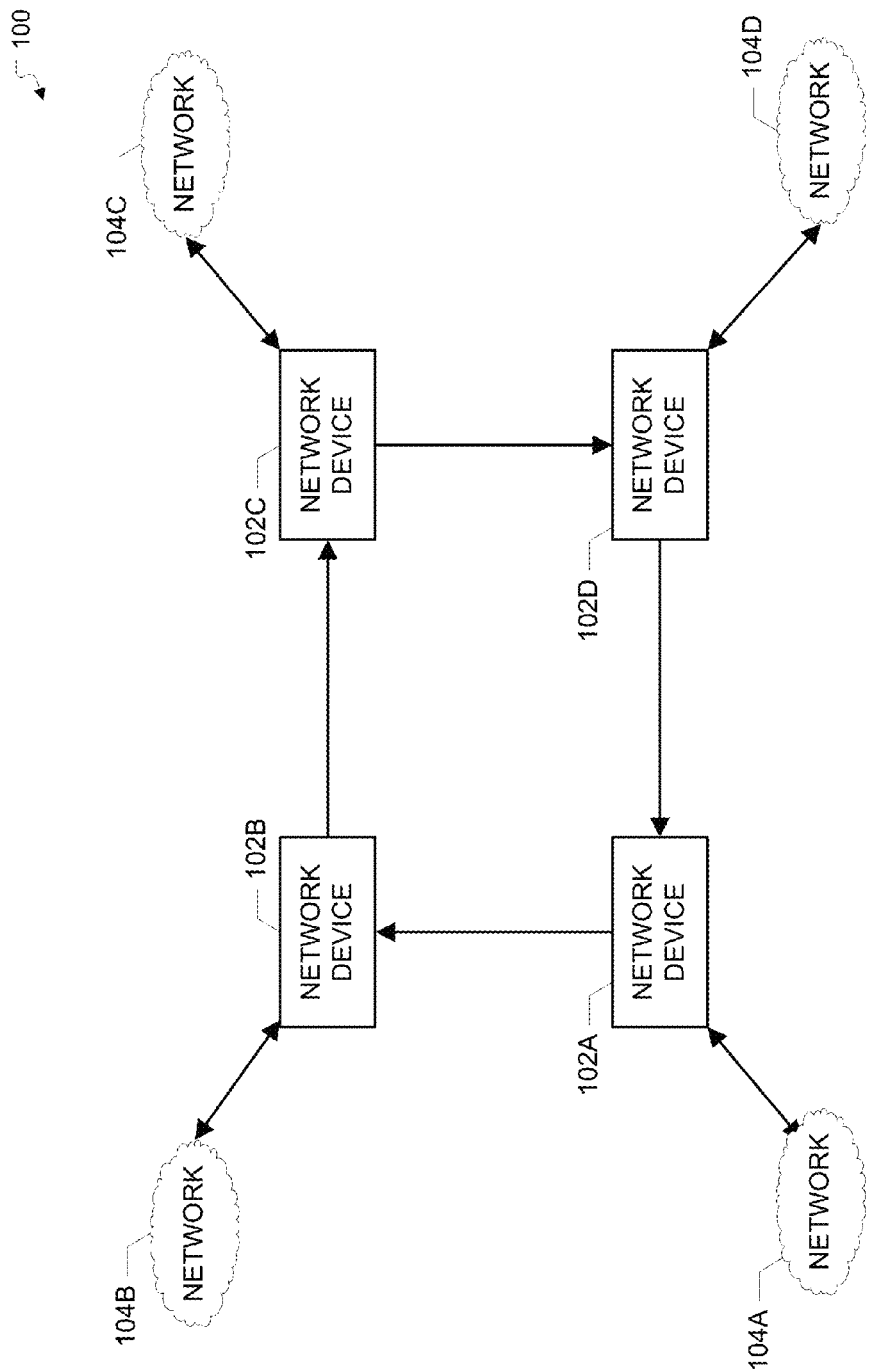
FIG. 1 illustrates an example network environment in which a system for deadlock recovery of distributed devices may be implemented in accordance with one or more implementations.

FIG. 1 illustrates an example network environment 100 in which a system for deadlock recovery of distributed devices may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The network environment 100 may include physically interconnected network devices 102A, 102B, 102C and 102D that may be coupled to networks 104A, 104B, 104C and 104D. In the network environment 100, the network devices 102A, 102B, 102C and 102D are interconnected such that the network device 102A routes data for one or more VLANs through the network device 102B, the network device 102B routes data for one or more VLANs through the network device 102C, and the network device 102D routes data for one or more VLANs through the network device 102A. The network devices 102A, 102B, 102C and 102D may be physically interconnected in any manner that supports the routing of the data traffic of the VLANs. The network devices 102A, 102B, 102C and 102D may be switch devices, routing devices, or generally any network devices that may receive and transmit data items, such as packets. In one or more implementations, the network environment 100 may be, or may be part of, a cloud computing topology. Alternatively, or in addition, one or more of the networks 104A, 104B, 104C and 104D may also be, or may be a part of, the cloud computing topology.

The network environment 100 and/or one or more of the networks 104A, 104B, 104C and 104D may also individually, or collectively, include any one or more of the following network topologies: a bus network, a star network, a ring network, a mesh network, a star-bus network, a tree or hierarchical network, and the like. The networks 104A, 104B, 104C and 104D may be public communication networks (such as the Internet, cellular data network, dialup modems over a telephone network), private communications networks (such as private local area network ("LAN"), leased lines), local subnets, or generally any set of interconnected devices.

The network devices 102A, 102B, 102C and 102D may include memory, such as random access memory (RAM), content addressable memory (CAM), or generally any memory, and logic and/or a processor, such as a packet processor, a network processor, or generally any processor. The network devices 102A, 102B, 102C and 102D may include multiple ports over which data items, such as packets, may be transmitted and received. A port of a network device 102A may be associated with one or more queues that may include pointers to data items, such as packets, that are stored in a buffer of the network device 102A. The queues and buffer may be used by the network device 102A to buffer incoming data when the received data rate for a given port is larger than what can be transmitted over the port.

The data items transmitted over a port of a network device 102A may be associated with different levels of service, or priorities, and the queues of the port may also be associated with the different levels of service, or priorities, of the data items. For example, a data item may be queued in a queue that is associated with the priority of the data item. Since a single port may be associated with multiple queues, a scheduler of the network device 102A may coordinate transmitting the data items that are queued across the queues of the port. The network device 102A may include a single scheduler for all of the ports, or each port may be associated with an individual scheduler. The scheduler may schedule the data items for transmission over the port based on, e.g., the levels of service, or priorities, associated with the data items. In one or more implementations, the scheduler may be implemented by a processor, or logic, of the network device 102A.

In the one or more implementations where the network environment 100 supports a cloud computing system, there may be one or more applications deployed in the cloud computing system that require lossless frame delivery, e.g. the one or more applications may require that no frames are dropped. The network devices 102A, 102B, 102C and 102D may implement the lossless frame delivery through a priority based flow control system, such as the priority flow control described in the Institute of Electrical and Electronics Engineers (IEEE) 802.1Qbb specification. For example, the priority based flow control system may assign a particular priority level to lossless packets, such as a priority level of two. In one or more implementations, a queue of a port of a network device 102A that is assigned to lossless traffic, or traffic with a priority level of two, may be associated with a flow control state bit that indicates whether the queue is in the transmit on (XON) state or the transmit off (XOFF) state. The scheduler of a network device 102A may not schedule packets from a queue that is in the transmit off state.

If the network device 102A receives a priority flow control message that indicates that traffic with a priority level of two should be paused, the network device 102A may set the flow control state bit to transmit off for any queues that are associated with a priority level of two. Conversely, if a network device 102A receives a priority flow control message that indicates that traffic with a priority level of two should be resumed, the network device 102A may set the flow control state to transmit on for any queues that are associated with a priority level of two. However, in the instance that the queues associated with lossless packets for all of the network devices 102A, 102B, 102C and 102D are in the transmit off state, the network environment 100 may be in a deadlock state. An example situation where the network devices 102A, 102B, 102C and 102D may enter a deadlock state is discussed further below with respect to FIG. 5.

In order to allow the network devices 102A, 102B, 102C and 102D to recover from a deadlock state, one or more of the network devices 102A, 102B, 102C and 102D may implement a system for deadlock recovery. In one or more implementations, the system for deadlock recovery may be implemented on a per network device 102A, 102B, 102C and 102D, a per port, or a per queue basis. For example, when one or more criteria are met, one or more of the network devices 102A, 102B, 102C and 102D may enter a deadlock recovery state. In the deadlock recovery state, the network devices 102A, 102B, 102C and 102D may drop queued lossless packets that have a packet age that is greater than a threshold. Although it may be undesirable to drop lossless packets, it may be necessary in order to alleviate the even more undesirable deadlock state. By dropping the queued lossless packets, the memory utilization of one or more of the network devices 102A, 102B, 102C and 102D may be reduced. Therefore one or more of the network devices 102A, 102B, 102C and 102D may be able to resume receiving lossless packets, thereby relieving the deadlock. The deadlock recovery state is discussed further below with respect to FIGS. 3 and 4.

Figure 2:
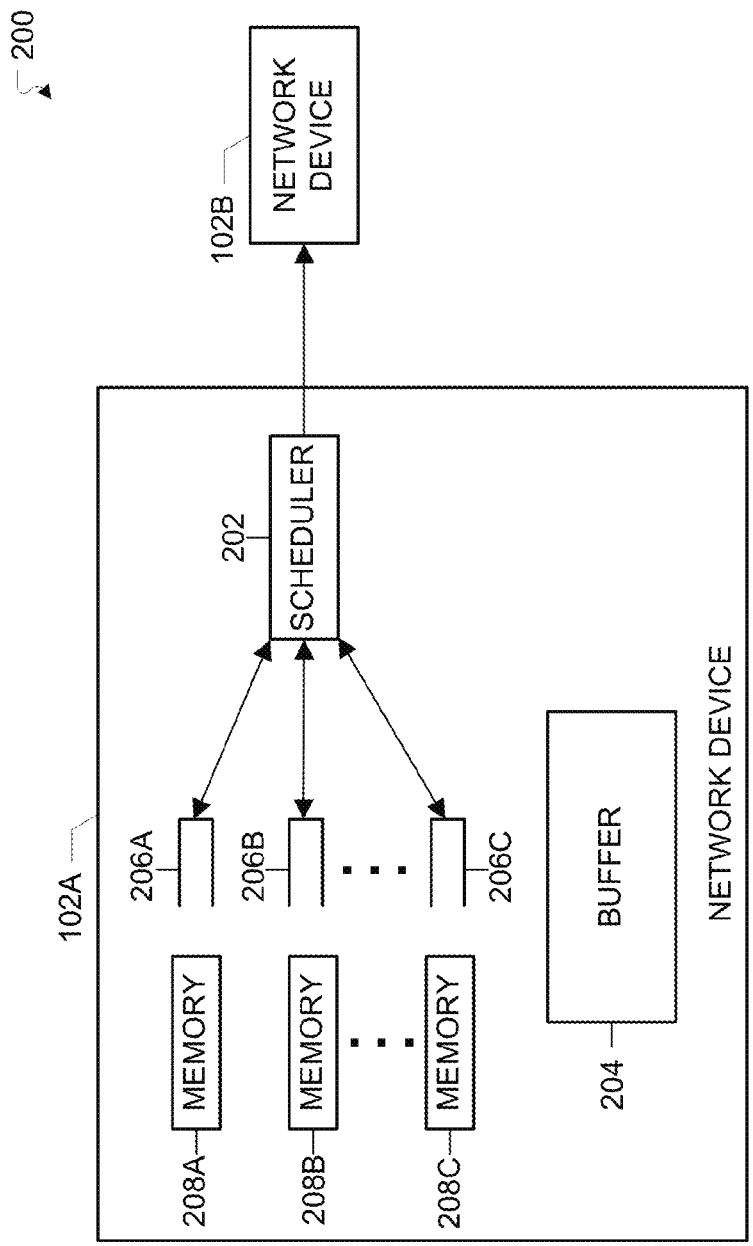
FIG. 2 illustrates an example network environment in which a system for deadlock recovery of distributed devices may be implemented in accordance with one or more implementations.

FIG. 2 illustrates an example network environment 200 in which a system for deadlock recovery of distributed devices may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The network environment 200 may include a network device 102A and a network device 102B. The network device 102A may include a buffer 204, one or more schedulers 202, queues 206A, 206B and 206C, and memories 208A, 208B and 208C that are associated with the queues 206A, 206B and 206C. The memories 208A, 208B and 208C may include registers, or other hardware that is capable of storing information. In one or more embodiments, the network device 102A may include multiple ports that may share the buffer 204. However, the ports may be associated with separate schedulers 202, queues 206A, 206B and 206C, and memories 208A, 208B and 208C.

In operation, a memory 208A that is associated with a queue 206A may store an enable bit, a timer, an ignore flow control state bit, a flow control state bit, and one or more statistics related to the associated queue 206A. The statistics may include the number of times that the deadlock recovery state was entered for the queue 206A, the number of packets that were dropped from the queue 206A while in a deadlock recovery state, or generally any statistics related to the queue 206A. In one or more implementations, the statistics may be generated and stored on a per queue 206A, per port, or per network device 102A basis. The enable bit may indicate whether the system for deadlock recovery is enabled for the queue 206A and the ignore flow control state bit may indicate whether the queue 206A is presently in the deadlock recovery state, e.g. whether the flow control bit for the queue 206A should be ignored.

In one more implementations, the deadlock recovery state may be initiated by software. For example, the network device 102A may transmit an interrupt to software upon detecting the deadlock state. The software may then determine whether to initiate the deadlock recovery state based on the transmitted interrupt. In these one or more implementations, the software may analyze the network environment 100 and determine whether the deadlock recovery should be initiated. If the deadlock recovery state is initiated by software for the network device 102A, the statistics related to the queues 206A, 206B and 206C may be generated and/or stored by the software and therefore the memories 208A, 208B and 208C may not include registers or other hardware for storing the statistics.

The buffer 204 may store received packets that are queued for transmission over the ports of the network device 102A. The queues 206A, 206B and 206C may store pointers to the packets in the buffer 204, in the order which the packets were received. The queues 206A, 206B and 206C may be associated with different priorities, and the queues 206A, 206B and 206C may queue packets that have priorities that match those of the queues 206A, 206B and 206C. The scheduler 202 may schedule the packets for delivery over one or more ports of the network device 102A based on the order in which the packets are queued in the queues 206A, 206B and 206C. The scheduler 202 may determine whether to schedule packets from a given queue 206A based on the bits stored in the memory 208A associated with the queue 206A. For example, if the flow control state bit for a given queue 206A is set to transmit on, the scheduler 202 may schedule packets queued in the queue 206A for transmission, and if the flow control state bit for the queue 206A is set to transmit off, the scheduler 202 may not schedule packets queued in the queue 206A for transmission.

However, if the system for deadlock recovery is enabled for the queue 206A, e.g. the enable bit for the queue 206A is set to on, and if the queue 206A is in the deadlock recovery state, e.g. the ignore flow control bit for the queue 206A is set to on and the flow control state bit for the queue 206A is set to transmit off, the scheduler 202 may service packets that are queued in the queue 206A, even though the flow control state bit for the queue 206A is set to transmit off. However, while in the deadlock recovery state, the scheduler 202 may drop the packets that are queued in the queue 206A instead of transmitting the packets, or scheduling the packets for transmission.

Figure 3:
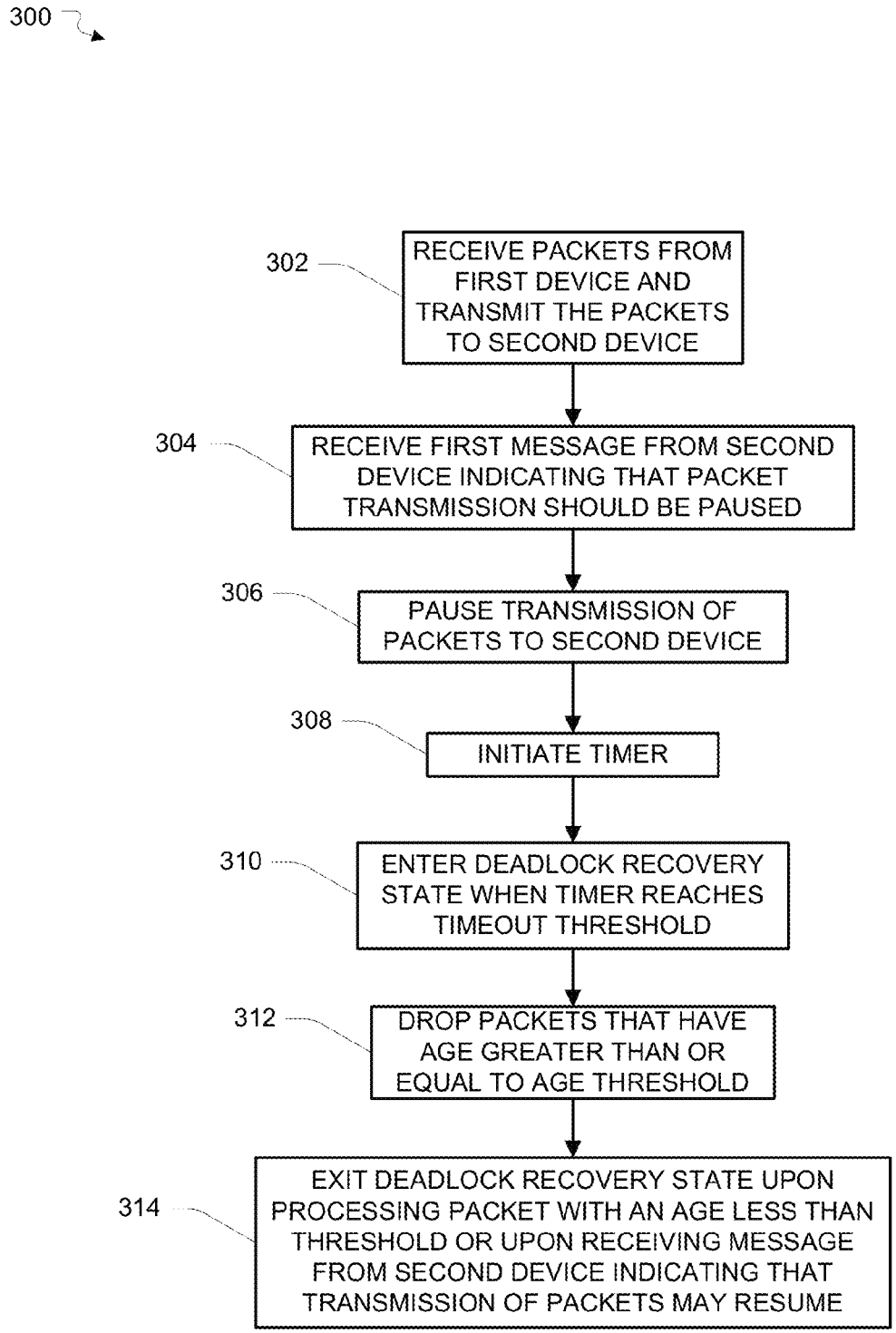
FIG. 3 illustrates a flow diagram of an example process in a system for deadlock recovery of distributed devices in accordance with one or more implementations.

FIG. 3 illustrates a flow diagram of an example process 300 in a system for deadlock recovery of distributed devices in accordance with one or more implementations. For explanatory purposes, example process 300 is described herein with reference to the network devices 102A, 102B, 102C and 102D of example network environments 100, 200 of FIGS. 1 and 2; however, example process 300 is not limited to the network devices 102A, 102B, 102C and 102D of the example network environments 100, 200 of FIGS. 1 and 2. Further for explanatory purposes, the blocks of example process 300 are described herein as occurring in serial, or linearly. However, multiple blocks of example process 300 may occur in parallel. In addition, the blocks of example process 300 need not be performed in the order shown and/or one or more of the blocks of example process 300 need not be performed.

A network device 102A receives packets from a first network device, such as the network device 102D, and transmits the received packets over a port to a second network device, such as the network device 102B (302). In one or more implementations, the transmitted packets may be lossless packets and may be associated with a priority value that is indicative of lossless traffic. In one or more implementations, the network device 102A may queue the packets in a queue that is associated with the port over which the packets are being transmitted to the network device 102B, such as the queue 206A. The enable bit in the memory 208A that is associated with the queue 206A may be set to on, thereby enabling the system for deadlock recovery for the queue 206A, and the flow control state bit of the queue 206A may be set to transmit on, such that the scheduler 202 services packets that are queued in the queue 206A.

The network device 102A may receive a message from the network device 102B that indicates that the transmission of the packets that are queued in the queue 206A to the network device 102B should be paused (304). For example, the network device 102B may send a priority flow control message to the network device 102A that indicates that the transmission of packets having the priority that is associated with the queue 206A should be paused. The network device 102A may pause the transmission of packets having the identified priority to the network device 102B, in response to receiving the first message (306). For example, the network device 102A may set the flow control state bit for any queues 206A, 206B and 206C that are associated with lossless traffic, such as the queue 206A, to transmit off. The network device 102A may continue to buffer and queue the packets received from, e.g., the network device 102D, but may not transmit any of the received packets to the network device 102B. The network device 102A may also initiate a timer associated with the queue 206A upon pausing the transmission of the packets to the network device 102B (308). If multiple queues 206A, 206B, and 206C are associated with lossless packets, the network device 102A may initiate separate timers for the queues 206A, 206B and 206C.

If the network device 102A does not receive a resume message from the network device 102B before the timer reaches a timeout threshold, the network device 102A enters the deadlock recovery state (310). For example, the network device 102A may set the flow control ignore bit for the queue 206A to on. In one or more implementations, the timeout threshold may be user-configurable. Thus, a scheduler 202 of the network device 102A may start servicing packets from the queue 206A; however, instead of transmitting the packets to the network device 102B, or scheduling the packets for transmission to the network device 102B, the scheduler 202 drops packets from the queue 206A if the packets have an age that is greater than or equal to an age threshold (312). In one or more implementations, the network device 102A may transmit the lossless packets while in the transmit off state, in order to alleviate the deadlock state, thereby allowing the network device 102B to determine whether to drop the lossless packets.

The network device 102A may exit the deadlock recovery state when the scheduler 202 processes a packet from the queue 206A that has a packet age that is less than the age threshold, or when the network device 102A receives a message from the network device 102B that indicates that the transmission of the packets that are queued in the queue 206A may resume. (314). For example, the network device 102B may transmit a priority flow control message to the network device 102A that indicates that the transmission of the packets having the identified priority may resume. If the scheduler 202 processes a packet from the queue 206A that has a packet age that is less than the threshold before a resume message is received, the timer for the queue 206A may be reinitiated (308), and the process may be repeated (310-314) until the resume message is received. Alternatively, or in addition, the network device 102A may exit the deadlock recovery state for the queue 206A if the queue 206A is empty.

In one or more implementations, the packet age may be determined based on a timestamp associated with the packet, such as a timestamp indicating when the packet was created or when the packet was received. Alternatively, or in addition, the packet age of the packet may be set to zero when the packet is received and the packet age may be incremented, such as by a background process, while the packet is buffered by the network device 102A. In one or more implementations, the age threshold may be user-configurable.

Figure 4:
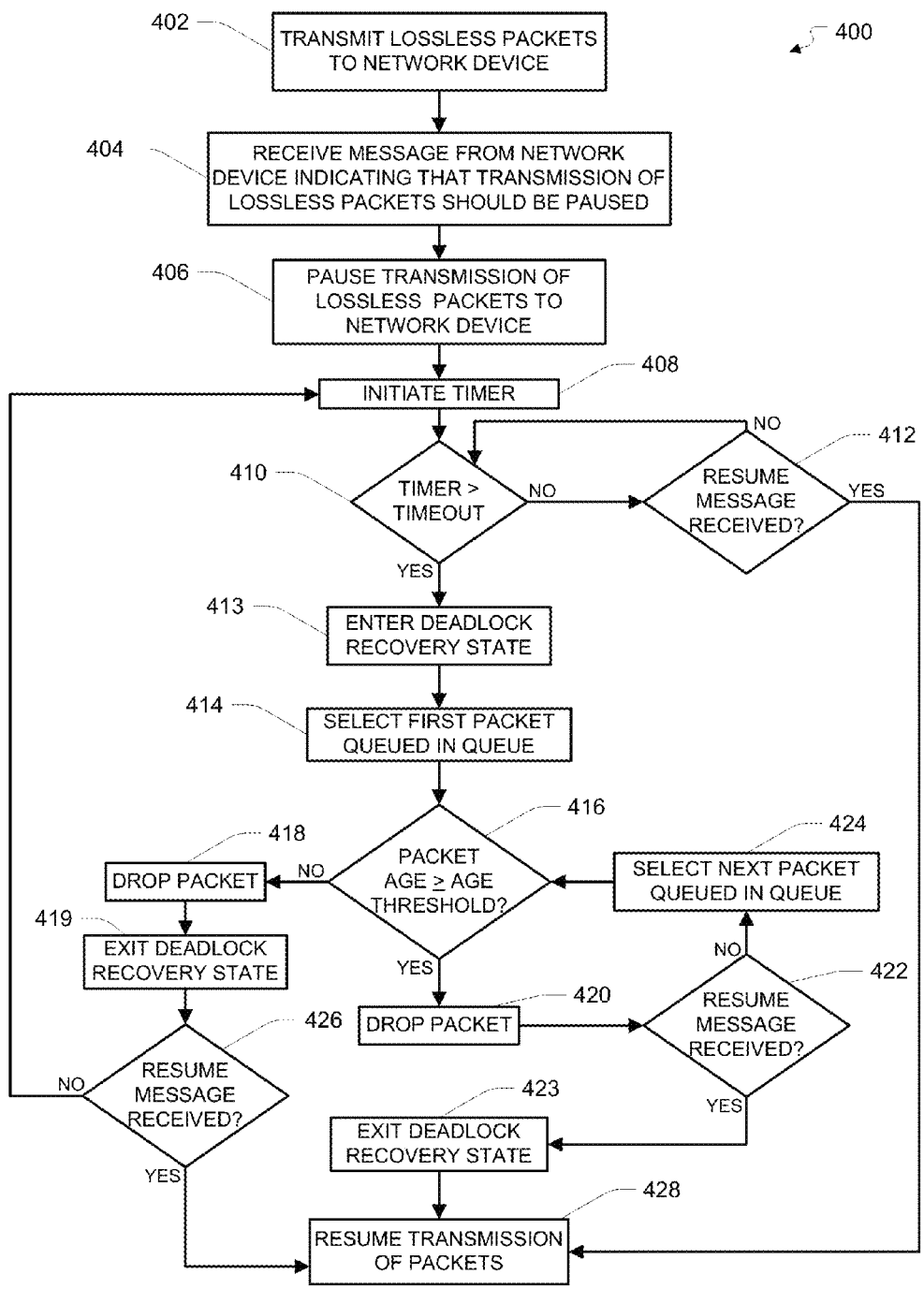
FIG. 4 illustrates a flow diagram of an example process in a system for deadlock recovery of distributed devices in accordance with one or more implementations.

FIG. 4 illustrates a flow diagram of an example process 400 in a system for deadlock recovery of distributed devices in accordance with one or more implementations. For explanatory purposes, example process 400 is described herein with reference to the network devices 102A, 102B, 102C and 102D of example network environments 100, 200 of FIGS. 1 and 2; however, example process 400 is not limited to the network devices 102A, 102B, 102C and 102D of the example network environments 100, 200 of FIGS. 1 and 2. Further for explanatory purposes, the blocks of example process 400 are described herein as occurring in serial, or linearly. However, multiple blocks of example process 400 may occur in parallel. In addition, the blocks of example process 400 need not be performed in the order shown and/or one or more of the blocks of example process 400 need not be performed.

The network device 102A may transmit lossless packets that are queued in the queue 206A to the network device 102B (402). For example, the network device 102A may receive the lossless packets from the network device 102D. The network device 102A may store the packets in the buffer 204 and may store pointers to the packets in one of the queues 206A, 206B and 206C, such as queues 206A, that is associated with the port over which the packets are transmitted to the network device 102B and that is associated with the priority value of the lossless packets. The pointers may be stored in the queue 206A in the same order that the packets were received. The scheduler 202 may schedule the packets that are queued in the queues 206A, 206B and 206C for transmission, such as to the network device 102B.

The network device 102A may receive a message from the network device 102B that indicates that the transmission of the lossless packets should be paused (404). For example, the lossless packets may be associated with a priority value, such as two, and the network device 102B may transmit a message to the network device 102A that indicates that the transmission any packets having the priority value of two should be paused. The network device 102A may pause the transmission of the lossless packets that are queued in the queue 206A to the network device 102B, in response to receiving the message (406), e.g. the network device 102A may set the flow control state bit for the queue 206A to transmit off. The network device 102A may also initiate a timer that is associated with the queue 206A (408), in response to receiving the message.

The network device 102A, or a component thereof, such as the scheduler 202, may determine whether the timer for the queue 206A has reached a timeout threshold (410). If the timer for the queue 206A has not reached the timeout threshold, the network device 102A may determine whether a resume message has been received with regard to the packets that are queued in the queue 206A (412). If the resume message has not been received (412), the network device 102A continues to pause the transmission of the lossless packets from the queue 206A to the network device 102B. If the resume message has been received (412), the network device 102A resumes the transmission of the lossless packets queued in the queue 206A to the network device 102B (428), e.g. by setting the flow control state bit for the queue 206A to transmit on.

If the timer for the queue 206A reaches the timeout threshold (410), the deadlock recovery state is entered for the queue 206A (413), e.g. the ignore flow control bit is set to on for the queue 206A, and the scheduler 202 of the network device 102A begins to process the packets that are queued in the queue 206A irrespective of the flow control state of the queue 206A. Although the scheduler 202 ignores the flow control state bit of the queue 206A, the scheduler 202 still services the queue 206A in the same manner and order that all of the queues 206A, 206B and 206C are serviced. The scheduler 202 selects the first packet that is queued in the queue (414). If the age of the packet is greater than or equal to an age threshold (416), the scheduler 202 drops the packet (420), and determines whether a resume message has been received that corresponds to the priority value associated with the lossless packets (422). In one or more implementations, the age check of the packet relative to the age threshold (416) may be optional. In these one or more implementations, the scheduler 202 may drop packets (420) irrespective of packet age, e.g. until a resume message is received (422), or until another event causes the deadlock recovery state to be exited.

If the resume message has not been received that corresponds to the priority value associated with the lossless packets that are queued in the queue 206A (422), the scheduler 202 selects the next packet that is queued in the queue 206A (424). If the resume message has been received (422), the deadlock recovery state may be exited for the queue 206A (423), e.g. by setting the ignore flow control bit for the queue 206A to off, and the transmission of packets from the queue 206A may resume (428), e.g. by setting the flow control state bit to transmit on for the queue 206A. In one or more implementations, the deadlock recovery state may also be exited for the queue 206A when the timer for the queue 206A, or a recovery timer that is initiated upon entering the deadlock recovery state for the queue 206A, reaches a exit deadlock recovery threshold.

The scheduler 202 may continue to drop packets (420) from the queue 206A, and consequently the buffer 204, until the scheduler 202 processes a packet that has a packet age that is less than the age threshold (416). The scheduler 202 may drop the packet that has the packet age that is less than the age threshold (418) and exit the deadlock recovery state for the queue 206A (419), e.g. the scheduler 202 may set the ignore flow control state to off for the queue 206A. The network device 102A may determine whether a resume message has been received with respect to the packets that are queued in the queue 206A (426). If a resume message has not been received (426), the timer for the queue 206A may be re-initiated (408), and the process (408-426) may be repeated until a resume message is received. If a resume message has been received (426), the flow control state bit for the queue 206A may be set to transmit off, and the scheduler 202 may resume scheduling packets from the queue 206A for transmission to the network device 102B (428).

Figure 5:
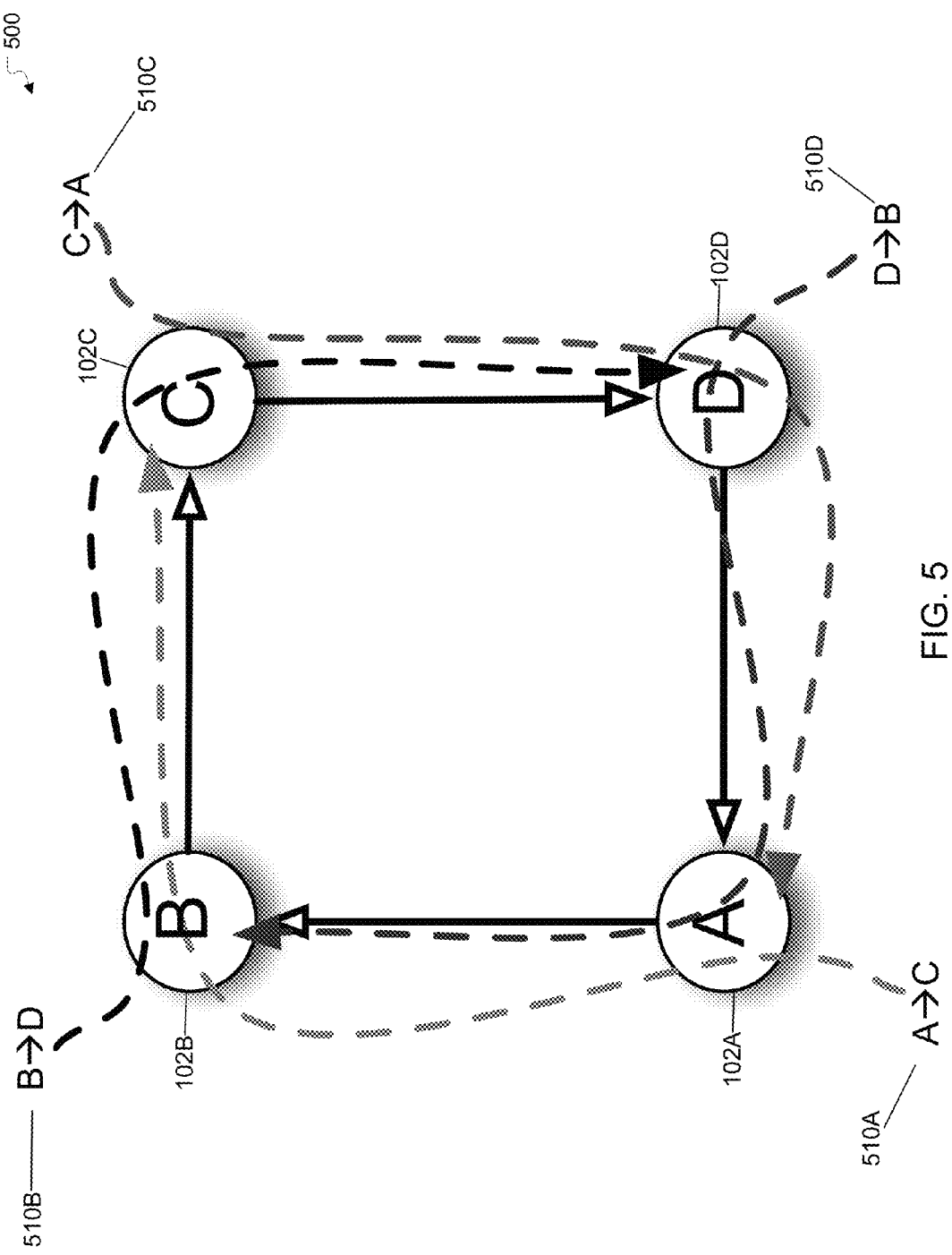
FIG. 5 illustrates multiple spanning trees of an example network environment in which a system for deadlock recovery of distributed devices may be implemented in accordance with one or more implementations.

FIG. 5 illustrates spanning trees 510A, 510B, 510C and 510D of an example network environment 500 in which a system for deadlock recovery of distributed devices may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The example network environment 500 may include network devices 102A, 102B, 102C and 102D. The network environment 500 may also be associated with spanning trees 510A, 510B, 510C and 510D that indicate how data traffic flows through the network environment 500 for various VLANs. For example, data traffic of a first VLAN may enter the network environment 500 at network device 102A, may be transmitted from the network device 102A to the network device 102B, and from the network device 102B to the network device 102C. Although the spanning trees 510A, 510B, 510C and 510D are individually loop-free in the network environment 500, the lossless traffic of the spanning trees 510A, 510B, 510C and 510D in aggregate may form a loop in the network environment 500 that may result in a deadlock.

For example, if the network device 102A becomes congested with lossless traffic of any VLAN that is being transmitted by network device 102D, the network device 102A may transmit a message to the network device 102D that indicates that the transmission of the lossless traffic to the network device 102A should be paused. The network device 102D may pause the transmission of the lossless traffic to the network device 102A, and may start buffering the lossless traffic received from the network device 102C. However, if the network device 102D does not receive a resume message from the network device 102A for a period of time, the buffers of the network device 102D may reach capacity, or may reach a threshold level. If the buffers of the network device 102D reach their capacity, the network device 102D may transmit a message to the network device 102C that indicates that the network device 102C should pause the transmission of lossless traffic to the network device 102D.

In some instances, the request to pause transmission of lossless traffic may propagate from the network device 102A, to the network device 102D, to the network device 102C, to the network device 102B, and back to the network device 102A. In this instance, all of the network devices 102A, 102B, 102C and 102D will have paused the transmission of the lossless traffic. Since all of the network devices 102A, 102B, 102C and 102D have paused the transmission of lossless traffic, none of the network devices 102A, 102B, 102C and 102D can transmit lossless traffic from their buffers, and therefore the network devices 102A, 102B, 102C and 102D have become deadlocked.

However, in the subject system for deadlock recovery of distributed devices, the network devices 102A, 102B, 102C and 102D initiate a timer for any queues 206A, 206B, 206C from which the transmission of lossless traffic has been paused. If a timer of a queue 206A reaches a timeout threshold, older packets are dropped from the queue 206A and from the buffer 204, which will eventually result in reducing the capacity of the buffer 204 of at least one of the network devices 102A, 102B, 102C and 102D, such that at least one of the network devices 102A, 102B, 102C and 102D will eventually transmit a message indicating that the transmission of lossless packets may resume, thereby alleviating the deadlock state.

Figure 6:
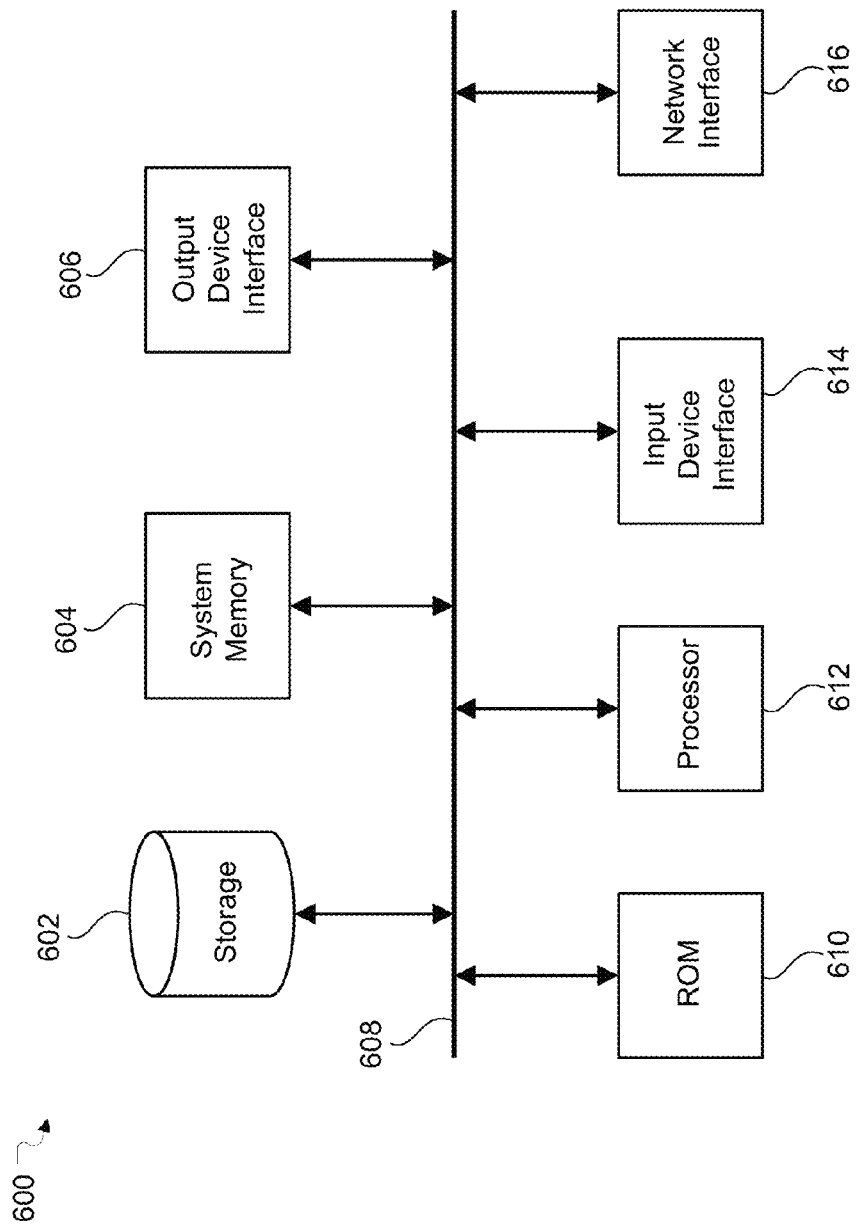
FIG. 6 conceptually illustrates an electronic system with which any implementations of the subject technology may be implemented.

FIG. 6 conceptually illustrates electronic system 600 with which any implementations of the subject technology are implemented. Electronic system 600, for example, can be a desktop computer, a laptop computer, a tablet computer, a server, a switch, a router, a base station, a receiver, a phone, a personal digital assistant (PDA), or generally any electronic device that transmits signals over a network. Such an electronic system includes various types of computer readable media and interfaces for various other types of computer readable media. Electronic system 600 includes bus 608, processing unit(s) 612, system memory 604, read-only memory (ROM) 610, permanent storage device 602, input device interface 614, output device interface 606, and network interface 616, or subsets and variations thereof.

Bus 608 collectively represents all system, peripheral, and chipset buses that communicatively connect the numerous internal devices of electronic system 600. In one or more implementations, bus 608 communicatively connects processing unit(s) 612 with ROM 610, system memory 604, and permanent storage device 602. From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off. One or more implementations of the subject disclosure use a mass-storage device (such as a magnetic or optical disk and its corresponding disk drive) as permanent storage device 602.

Other implementations use a removable storage device (such as a floppy disk, flash drive, and its corresponding disk drive) as permanent storage device 602. Like permanent storage device 602, system memory 604 is a read-and-write memory device. However, unlike permanent storage device 602, system memory 604 is a volatile read-and-write memory, such as random access memory. System memory 604 stores any of the instructions and data that processing unit(s) 612 needs at runtime. In one or more implementations, the processes of the subject disclosure are stored in system memory 604, permanent storage device 602, and/or ROM 610. From these various memory units, processing unit(s) 612 retrieves instructions to execute and data to process in order to execute the processes of one or more implementations.

Bus 608 also connects to input and output device interfaces 614 and 606. Input device interface 614 enables a user to communicate information and select commands to the electronic system. Input devices used with input device interface 614 include, for example, alphanumeric keyboards and pointing devices (also called "cursor control devices"). Output device interface 606 enables, for example, the display of images generated by electronic system 600. Output devices used with output device interface 606 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 6, bus 608 also couples electronic system 600 to a network (not shown) through network interface 616. In this manner, the computer can be a part of a network of computers (such as a local area network ("LAN"), a wide area network ("WAN"), or an Intranet, or a network of networks, such as the Internet. Any or all components of electronic system 600 can be used in conjunction with the subject disclosure.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. In one or more implementations, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more implementations, the computer readable media is non-transitory computer readable media, computer readable storage media, or non-transitory computer readable storage media.

In one or more implementations, a computer program product (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for deadlock recovery for distributed devices, the method comprising:
   receiving a pause message from a network device that indicates that transmission of packets to the network device should be paused;
   initiating a timer and pausing the transmission of the packets to the network device without dropping the packets, in response to the receiving the pause message;
   entering a deadlock recovery state if the timer reaches a timeout threshold before receiving a resume message from the network device that indicates that the transmission of the packets to the network device can resume, wherein none of the packets are dropped prior to entering the deadlock recovery state;
   dropping the packets that have a packet age that is greater than or equal to an age threshold, when in the deadlock recovery state; and
   exiting the deadlock recovery state upon dropping one of the packets that has the packet age that is less than the age threshold, or upon receiving the resume message that indicates that the transmission of packets can resume.

2. The method of claim 1, further comprising resuming the transmission of the packets to the network device, in response to receiving the resume message.

3. The method of claim 1, further comprising exiting the deadlock recovery state when a recovery timer that is initiated upon entering the deadlock recovery state reaches an exit deadlock recovery threshold.

4. The method of claim 1, wherein the packets comprise lossless packets that are queued in one of a plurality of queues, the one of the plurality of queues being associated with a priority value.

5. The method of claim 4, wherein the pause message comprises a priority flow control message that indicates that the transmission of packets queued in any of the plurality of queues that is associated with the priority value should be paused.

6. The method of claim 4, wherein the entering the deadlock recovery state if the timer reaches the timeout threshold before the receiving the resume message further comprises ignoring a flow control state of the one of the plurality of queues when the timer reaches the timeout threshold before the receiving the resume message.

7. The method of claim 1, further comprising:
   reinitiating the timer in response to exiting the deadlock recovery state when the resume message has not been received; and
   re-entering the deadlock recovery state when the timer reaches the threshold value and the resume message has not been received.

8. The method of claim 1, wherein the packets are associated with one of a plurality of virtual local area networks (VLANs) and the plurality of VLANs are associated with a plurality of spanning trees.

9. The method of claim 1, wherein the entering the deadlock recovery state is initiated by software.

10. The method of claim 1, further comprising:
    storing a number of times that the deadlock recovery state is entered and a number of the packets that are dropped.

11. A non-transitory machine-readable medium embodying instructions that, when executed by a machine, allow the machine to perform a method for deadlock recovery for distributed devices, the method comprising:
    receiving lossless packets from a first device, queuing the lossless packets in one of a plurality of queues for transmission to a second device, and transmitting the lossless packets to the second device in an order in which the lossless packets are queued, wherein each lossless packet has a packet age that indicates when each lossless packet was received from the first device;
    receiving a pause message from the second device that indicates that transmission of lossless packets to the second device should be paused;
    pausing the transmission of the lossless packets to the second device without dropping any of the lossless packets and initiating a timer associated with the one of the plurality of queues in response to receiving the pause message;
    resuming the transmission of the lossless packets to the second device if a resume message is received from the second device that indicates that the transmission of the lossless packets to the second device can resume, otherwise if the timer reaches a timeout threshold before the resume message is received from the second device without having dropped any of the lossless packets prior to the timer reaching the timeout threshold:
    individually processing and dropping the lossless packets in the order which the lossless packets are queued until a lossless packet having the packet age that is less than an age threshold is processed and dropped, or until the resume message is received from the second device; and
    if the lossless packet having the packet age that is less than the age threshold is processed and dropped before the resume message is received, repeating the initiating the timer and the processing and the dropping the lossless packets, otherwise receiving the resume message and resuming the transmission of the lossless packets to the second device.

12. The non-transitory machine-readable medium of claim 11, wherein the transmitting the lossless packets to the second device in the order in which the lossless packets are queued is performed at least in part by a scheduler that schedules packets for transmission to the second device that are queued in each of the plurality of queues.

13. The non-transitory machine-readable medium of claim 12, wherein each of the plurality of queues is associated with a flow control state that comprises either an on state or an off state, and the scheduler only schedules the packets for transmission that are queued in any of the plurality of queues that are associated with the on state.

14. The non-transitory machine-readable medium of claim 13, wherein the pausing the transmission of the packets comprises setting the flow control state of the one of the plurality of queues to the off state.

15. The non-transitory machine-readable medium of claim 14, wherein the scheduler ignores the flow control state of the one of the plurality of queues when the timer reaches the timeout threshold.

16. The non-transitory machine-readable medium of claim 11, wherein the lossless packets are associated with one of a plurality of virtual local area networks (VLANs) and the plurality of VLANs are associated with a plurality of spanning trees.

17. The non-transitory machine-readable medium of claim 11, wherein the processing and the dropping the lossless packets is initiated by software.

18. The non-transitory machine-readable medium of claim 11, the method further comprising:
storing a number of packets that are dropped and a number of times that the timer reaches the threshold.

19. A system for deadlock recovery of distributed devices, the system comprising:
one or more processors; and
a memory including instructions that, when executed by the one or more processors, cause the one or more processors to:

receive lossless packets from a first device, queue the lossless packets in a queue for transmission to a second device, and transmit the lossless packets to the second device in an order which the lossless packets are queued in the queue;

receive a pause message from the second device that indicates that transmission of the lossless packets that are queued in the queue should be paused;

initiate a timer associated with the queue and pause the transmission of the lossless packets that are queued in the queue, in response to the receiving the pause message;

enter a deadlock recovery state for the queue if the timer reaches a timeout threshold before a resume message is received from the second device that indicates that the transmission of lossless packets that are queued in the queue can resume, otherwise receive the resume message from the second device and resume the transmission of the lossless packets that are queued in the queue;

drop the lossless packets from the queue that have a packet age that is greater than or equal to an age threshold, while in the deadlock recovery state;

exit the deadlock recovery state, upon dropping one of the lossless packets from the queue that has the packet age that is less than the age threshold, or when the resume message is received from the second device, wherein receipt of the resume message is determined after each of the lossless packets is dropped; and re-initiate the timer if the resume message has not been received, otherwise receive the resume message and resume the transmission of the lossless packets that are queued in the queue.

20. The system of claim 19, wherein the lossless packets are associated with one of a plurality of virtual local area networks (VLANs) and the plurality of VLANs are associated with a plurality of spanning trees.

* * * * *